UNITED STATES PATENT OFFICE.

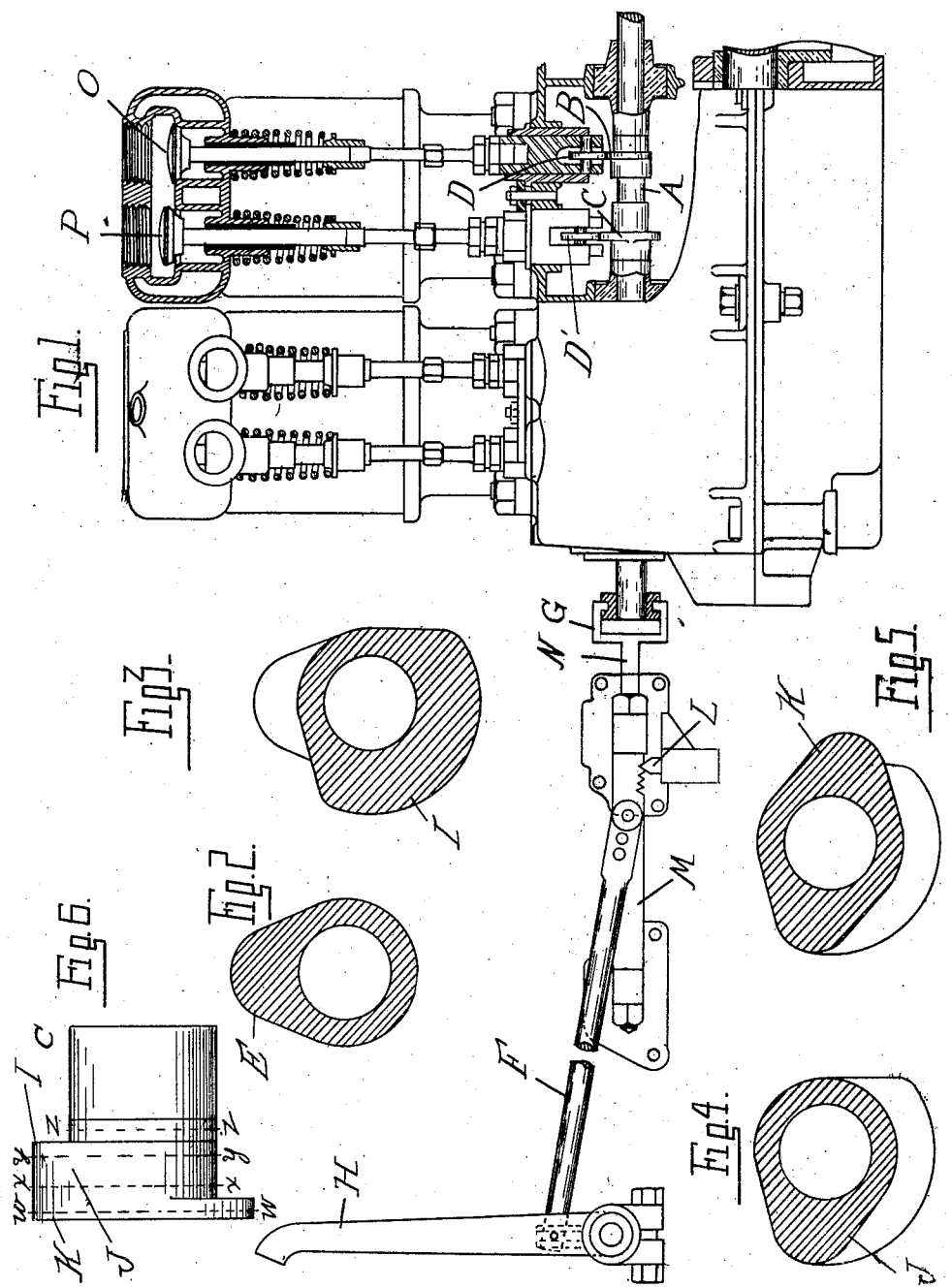

ERNEST E. SWEET, OF DETROIT, MICHIGAN, ASSIGNOR TO CADILLAC MOTOR CAR COMPANY, OF DETROIT, MICHIGAN, A CORPORATION OF MICHIGAN.

PNEUMATIC BRAKE FOR MOTOR-VEHICLES.

No. 925,528.     Specification of Letters Patent.     Patented June 22, 1909.

Application filed January 11, 1908. Serial No. 410,440.

*To all whom it may concern:*

Be it known that I, ERNEST E. SWEET, a citizen of the United States of America, residing at Detroit, in the county of Wayne and State of Michigan, have invented certain new and useful Improvements in Pneumatic Brakes for Motor-Vehicles, of which the following is a specification, reference being had to the accompanying drawings.

It is the object of the invention to obtain a progressively increasing pneumatic braking effect by using the explosion engine as a dash pot and by so controlling it as to vary the resistance which it produces.

To this end the invention consists in the peculiar construction of the valve-operating mechanism, further in the means for controlling this mechanism to produce the braking effect, and further in the combination thereof with the actuating mechanism for the mechanical brake, as more fully hereinafter set forth.

In the drawings; Figure 1 is an elevation of the valve controlling mechanism as applied to the engine, illustrating diagrammatically its connection with the brake actuating mechanism; Figs. 2, 3, 4, and 5 are sections respectively on lines Z—Z, Y—Y, X—X, W—W, Fig. 6; and Fig. 6 is an elevation of the shiftable exhaust cam.

A is the cam shaft of an explosion engine, and upon which are mounted both the inlet valve controlling cam B and the exhaust valve cam C. The cam B is of suitable configuration to effect the movement of its co-operating valve rod D so as to produce the desired timing effect in the normal operation of the engine, and the cam C is provided with a portion E for properly timing the operation of the exhaust valve. The shaft A is mounted to be longitudinally adjustable and is connected with a suitable shifting mechanism, such as the link F, engaging a collar G upon the shaft, and connected with a foot lever H.

The cam C in addition to the portion E thereof, which controls the normal operation of the exhaust valve, is further provided with a plurality of adjacent portions I, J and K. The portion I is arranged to register with the valve rod D' when the shaft A is adjusted longitudinally a sufficient distance to disengage the cam B from the rod D, and the cam I is so fashioned as to open the exhaust valve during the suction stroke of the engine, and to close the valve for a portion, but not all, of the compression stroke. The adjacent cam J is arranged to open the exhaust valve during a portion of the suction stroke, and to maintain it closed for practically all of the compression stroke, while the next adjacent cam K is arranged to open the exhaust valve for a portion of every down-stroke of the engine (the explosion stroke as well as the suction stroke) and maintain it closed through practically all of each upward stroke (the compression and scavenging strokes of the engine).

With the cam construction just described, it will be understood that by movement of the pedal lever H the inlet valve operating mechanism will first be thrown out of operation, permitting said valve to remain seated, and thus cutting off the fuel supply. At the same time, an adjustment of the pedal, which brings the cam I in operative position, will cause the engine piston and cylinder to operate as a dash pot, but this operation is confined to a portion only of what would correspond to the suction and compression strokes of the engine when in normal operation. A further adjustment of the pedal lever bringing the cam J in operative position will cause the engine piston and cylinder to operate as a dash pot during the entire or practically the entire suction and compression strokes, but not during the strokes corresponding to the exploding and scavenging strokes of the engine when in operation. Finally an adjustment of the pedal, which brings the cam K into operative position, will cause the engine to operate as a dash pot practically all the time. Thus a progressively increasing resistance to the movement of the mechanism is effected by merely pressing upon the pedal H.

What I claim as my invention is:

1. The combination in an explosion engine, comprising an explosion cylinder and inlet and exhaust valves therefor, of means for normally actuating said exhaust valve, and an auxiliary mechanism for operating the exhaust valve for converting the cylinder into a dash pot.

2. The combination in an explosion engine, comprising an exhaust valve, of means for actuating the exhaust valve while the engine is operating as a motor, and a graduated auxiliary mechanism for actuating said exhaust valve to cause said cylinder to operate as a retarder of variable resistance.

3. The combination in an explosion engine, comprising an exhaust valve, a cam to actuate said valve while the engine is operating as a motor, and a second cam adapted to actuate said exhaust valve to cause said engine to act as a retarder.

4. The combination in an explosion engine, comprising an exhaust valve, a cam to actuate said valve while the engine is operating as a motor, and a series of auxiliary cams adapted to in turn actuate the exhaust valve to cause said engine to act as a retarder of increasing resistance.

5. The combination in an explosion engine, of inlet and exhaust valves therefor, means for normally actuating said valves, and means for throwing out of operation the actuating mechanism for one of said valves and operating the other valve to convert the engine into a dash pot.

6. The combination in an explosion engine, of inlet and exhaust valves therefor, of means for normally actuating said valves, and means for throwing out of operation the actuating mechanism for the inlet valve and for operating the exhaust valve to convert the engine into a dash pot, said means being adapted to effect various degrees of resistance.

7. The combination in an explosion engine, of inlet and exhaust valves therefor, a cam shaft, cams thereon for normally actuating said valves, an auxiliary cam on said shaft for said exhaust valve, means for shifting said cam shaft to throw the cam for normally operating said valves out of operation and to place the auxiliary cam into operative relation to the exhaust valve to cause said engine to act as a dash pot.

8. The combination in an explosion engine, of inlet and exhaust valves therefor, a cam shaft, cams thereon for normally actuating said valves, and means for converting the engine into a dash pot and for varying the degrees of resistance, comprising a plurality of graduated auxiliary cams on said cam shaft for the exhaust valve, and means for shifting said shaft to throw the cams, for normally operating the valves, out of operation and place one of said auxiliary cams into operative relation to the exhaust valve.

9. The combination with an explosion engine, of means controlling the valve-operated mechanism thereof for converting said engine into a dash pot, said means effecting various degrees of resistance to the movement of the motor, first, during a portion of alternate strokes, then through all of alternate strokes, and then through all of each stroke, for the purpose described.

In testimony whereof I affix my signature in presence of two witnesses.

ERNEST E. SWEET.

Witnesses:
AMELIA WILLIAMS,
NELLIE KINSELLA.